(12) United States Patent
Shin (10) Patent No.: US 12,536,642 B2
(45) Date of Patent: Jan. 27, 2026

(54) DEVICE FOR EVALUATING EDGE DEFECTS IN A SILICON WAFER AND METHOD THEROF

(71) Applicant: SK SILTRON CO., LTD., Gumi-si (KR)

(72) Inventor: Jung Won Shin, Gumi-si (KR)

(73) Assignee: SK SILTRON CO., LTD., Gumi-si (KR)

(*) Notice: Subject to any disclaimer, the term of this patent is extended or adjusted under 35 U.S.C. 154(b) by 325 days.

(21) Appl. No.: 18/172,940

(22) Filed: Feb. 22, 2023

(65) Prior Publication Data
US 2023/0289949 A1   Sep. 14, 2023

(30) Foreign Application Priority Data
Mar. 8, 2022   (KR) .................. 10-2022-0029144

(51) Int. Cl.
*G06T 7/00* (2017.01)
*G06V 10/74* (2022.01)
*G06V 10/82* (2022.01)

(52) U.S. Cl.
CPC .......... *G06T 7/0004* (2013.01); *G06V 10/761* (2022.01); *G06V 10/82* (2022.01)

(58) Field of Classification Search
CPC .............. G06T 7/0004; G06T 7/13; G06T 2207/10061; G06T 2207/20084; G06T 2207/30148; G06T 7/0006; G06V 10/761; G06V 10/82; G06V 10/25; G06V 2201/06;
(Continued)

(56) References Cited

U.S. PATENT DOCUMENTS

| 7,102,743 B2 | 9/2006 | Tsuji et al. |
| 9,342,879 B2 | 5/2016 | Minekawa et al. |
| 10,776,909 B2 | 9/2020 | Ikeda et al. |

(Continued)

FOREIGN PATENT DOCUMENTS

| CN | 109583465 A | 4/2019 |
| CN | 112395809 A | 2/2021 |

(Continued)

OTHER PUBLICATIONS

Korean Office Action for KR Application No. 10-2022-0029144 dated Apr. 19, 2024, 5 pages.

(Continued)

*Primary Examiner* — Andrew M Moyer
*Assistant Examiner* — Ahmed A Nasher
(74) *Attorney, Agent, or Firm* — Lewis Roca Rothgerber Christie LLP (57) ABSTRACT

A device for evaluating edge defects in a silicon wafer comprises an image acquiring unit configured to acquire image data of an edge region of the silicon wafer, a data preprocessing unit configured to measure an edge region of the silicon wafer using a measurement equipment when an edge defect is detected in the acquired image data to determine a defect attribute of the detected edge defect, and a processor.
The processor controls to learn the acquired image data to output a defect attribute corresponding to the detected edge defect, and verifies an accuracy of the output defect attribute of the edge defect based on the determined defect attribute of the edge defect.

11 Claims, 9 Drawing Sheets

(58) Field of Classification Search
CPC .... G06V 20/52; H01L 22/12; G01N 21/9501; G06N 20/00
See application file for complete search history.

(56) References Cited

U.S. PATENT DOCUMENTS

| | | |
|---|---|---|
| 11,263,737 B2 | 3/2022 | Sawlani et al. |
| 2019/0096053 A1* | 3/2019 | Asbag .................. G06T 7/0004 |
| 2021/0023717 A1* | 1/2021 | Yu .......................... G06V 20/58 |
| 2022/0222806 A1* | 7/2022 | Shaubi ................ G06V 10/774 |
| 2023/0197460 A1* | 6/2023 | Yang ................... G06V 10/752 |
| | | 438/689 |
| 2024/0127421 A1* | 4/2024 | Minekawa ......... G01N 23/2251 |

FOREIGN PATENT DOCUMENTS

| | | |
|---|---|---|
| CN | 113302478 A | 8/2021 |
| CN | 113439276 A | 9/2021 |
| JP | 7004145 B | 1/2022 |
| KR | 10-2003-0051784 A | 6/2003 |
| KR | 10-1105701 B1 | 1/2012 |
| KR | 10-2014-0044395 A | 4/2014 |
| KR | 10-2060084 B1 | 12/2019 |

OTHER PUBLICATIONS

Office Action for CN Application No. 202310246340.1 dated Jun. 24, 2025, 10 pages.

* cited by examiner

|     | #1 | #2 | #3 | #4 | #5  | #6  | #7  | #8  | #9 | #10 | #11 | #12 | #13 |
|-----|----|----|----|----|-----|-----|-----|-----|----|-----|-----|-----|-----|
| #1  | 0  | 0  | 0  | 0  | 0   | 0   | 0   | 0   | 0  | 0   | 0   | 0   | 0   |
| #2  | 0  | 0  | 0  | 0  | 0   | 0   | 0   | 0   | 0  | 0   | 0   | 0   | 0   |
| #3  | 0  | 0  | 0  | 0  | 0   | 0   | 0   | 0   | 0  | 0   | 0   | 0   | 0   |
| #4  | 0  | 0  | 0  | 0  | 0   | 0   | 0   | 0   | 0  | 0   | 0   | 0   | 0   |
| #5  | 0  | 0  | 0  | 0  | 757 | 4   | 0   | 0   | 0  | 0   | 0   | 0   | 0   |
| #6  | 0  | 0  | 0  | 0  | 2   | 474 | 5   | 15  | 0  | 2   | 4   | 0   | 0   |
| #7  | 0  | 0  | 0  | 0  | 0   | 28  | 241 | 322 | 0  | 0   | 3   | 0   | 2   |
| #8  | 0  | 0  | 0  | 0  | 0   | 1   | 9   | 53  | 0  | 0   | 7   | 0   | 2   |
| #9  | 0  | 0  | 0  | 0  | 6   | 1   | 3   | 32  | 0  | 0   | 33  | 0   | 0   |
| #10 | 0  | 0  | 0  | 0  | 0   | 18  | 34  | 59  | 0  | 77  | 2   | 0   | 12  |
| #11 | 0  | 0  | 0  | 0  | 0   | 8   | 33  | 11  | 0  | 0   | 237 | 0   | 2   |
| #12 | 0  | 0  | 0  | 0  | 0   | 18  | 45  | 37  | 0  | 1   | 24  | 0   | 3   |
| #13 | 0  | 0  | 0  | 0  | 0   | 7   | 7   | 0   | 0  | 0   | 7   | 0   | 40  |
| #14 | 0  | 0  | 0  | 0  | 0   | 0   | 0   | 11  | 0  | 6   | 0   | 0   | 0   |
| #15 | 0  | 0  | 0  | 0  | 0   | 8   | 4   | 0   | 0  | 0   | 1   | 0   | 4   |
| Sum | 0  | 0  | 0  | 0  | 766 | 571 | 383 | 629 | 0  | 86  | 319 | 0   | 69  |

DEVICE FOR EVALUATING EDGE DEFECTS IN A SILICON WAFER AND METHOD THEROF

CROSS-REFERENCE TO RELATED APPLICATION

This application claims priority to Korean Patent Application Number 10-2022-0029144, filed on Mar. 8, 2022, the entire content of which is incorporated herein by reference.

BACKGROUND OF THE INVENTION

1. Field of the Invention

The Embodiment relates to a device for evaluating edge defects in a silicon wafer and a method thereof.

BACKGROUND ART

In general, as a method of manufacturing a silicon wafer, a CZochralski (hereinafter referred to as CZ) method is widely used. In the CZ method, polycrystalline silicon is loaded into a quartz crucible and melted by heating it with a graphite heating element. Seed crystals are immersed in the silicon melt formed as a result of melting, and crystallization occurs at the interface. A single crystal silicon ingot is grown by pulling the seed crystal while rotating. Then, the silicon ingot is made into a wafer form by slicing, etching, and polishing.

As the design rules of a semiconductor process are increasingly miniaturized, defect management on an edge region of a silicon wafer is also emerging as important. Accordingly, a technique capable of evaluating edge defects in a silicon wafer is important.

However, a technique capable of evaluating edge defects in a silicon wafer has not yet been clearly proposed.

In particular, since the attributes of edge defects of a silicon wafer are not clearly classified, there is an urgent need for technology development.

DISCLOSURE OF INVENTION

Technical Problem

An object of embodiments is to solve the foregoing and other problems.

The other object of the embodiments is to provide a device for evaluating edge defects in a silicon wafer and a method thereof capable of easily performing edge defects of a silicon wafer.

Another object of the embodiments is to provide a device for evaluating edge defects in a silicon wafer and a method thereof capable of clearly classifying the attributes of edge defects of a silicon wafer.

Another object of the embodiments is to provide a device for evaluating edge defects in a silicon wafer and a method thereof based on learning capable of clear classification.

The technical problems of the embodiments are not limited to those described in this section, and include those that can be grasped through the description of the invention.

Technical Solution

According to a first aspect of the embodiment to achieve the above or other object, a device for evaluating edge defects in a silicon wafer, comprising: an image acquiring unit configured to acquire image data of an edge region of the silicon wafer; a data preprocessing unit configured to measure an edge region of the silicon wafer using a measurement equipment when an edge defect is detected in the acquired image data to determine a defect attribute of the detected edge defect; and a processor, wherein the processor is configured: to control to learn the acquired image data to output a defect attribute corresponding to the detected edge defect, and to verify an accuracy of the output defect attribute of the edge defect based on the determined defect attribute of the edge defect.

The measurement equipment includes at least one or more of a 3D laser microscope, SEM, and TEM.

The defect attributes include embossing, scratches, particles, crystals or ESF.

The device includes a learning model, and the learning model includes layered parameter formula.

The learning model outputs the defect attribute corresponding to the edge defect detected in the acquired image data using the layered parameter formula.

The processor changes the layered parameter formula when the accuracy of the defect attribute is less than or equal to a threshold value.

According to a second aspect of the embodiment, a method for evaluating edge defects in a silicon wafer, comprising: acquiring image data of an edge region of the silicon wafer; measuring an edge region of the silicon wafer using a measurement equipment when an edge defect is detected in the acquired image data to determine a defect attribute of the detected edge defect; controlling to learn the acquired image data to output a defect attribute corresponding to the detected edge defect; and verifying an accuracy of the output defect attribute of the edge defect based on the determined defect attribute of the edge defect.

Advantageous Effects

Effects of a device for evaluating edge defects in a silicon wafer and a method thereof according to the embodiments will be described as follows.

According to the embodiment, defect attributes of edge defects detected in the edge region of the silicon wafer can be accurately and easily identified by learning the image data acquired by the image acquisition unit using a learning model.

According to an embodiment, accuracy of defect attributes may be calculated through the defect attributes that are output every time a learning model is repeatedly trained on a large number of silicon wafers. If the accuracy of defect attribute is less than or equal to a threshold value, the layered parameter formula of the learning model may be changed. As the layered parameter formula of the learning model are periodically changed in this way, the accuracy of defect attributes output from the learning model may be remarkably increased.

By installing the learning model with improved accuracy as described above in an actual process line, accurate defect attributes of edge defects acquired from a silicon wafer may be determined without additional equipment. Accordingly, defect management of the edge region of the silicon wafer becomes more precise, and reliability can be improved through quality improvement of the silicon wafer.

A further scope of applicability of the embodiments will become apparent from the detailed description that follows. However, since various changes and modifications within the spirit and scope of the embodiments can be clearly understood by those skilled in the art, it should be understood that the detailed description and specific embodiments, such as preferred embodiments, are given by way of example only.

BEST MODE FOR CARRYING OUT THE INVENTION

Hereinafter, the embodiments disclosed in this specification will be described in detail with reference to the accompanying drawings, but the same or similar components are assigned the same reference numerals regardless of reference numerals, and redundant description thereof will be omitted. The suffixes 'module' and 'unit' for the components used in the following description are given or used interchangeably in consideration of ease of writing the specification, and do not have meanings or roles that are distinct from each other by themselves. In addition, the accompanying drawings are for easy understanding of the embodiments disclosed in this specification, and the technical idea disclosed in this specification is not limited by the accompanying drawings. Also, when an element such as a layer, region or substrate is referred to as being 'on' another element, this includes being directly on the other element or other intervening elements may be present therebetween.

It should be noted that an artificial intelligence model described in the following embodiments may be composed of various artificial neural network models, including, for example, a convolutional neural network (CNN) and a recurrent neural network (RNN).

Figure 1:
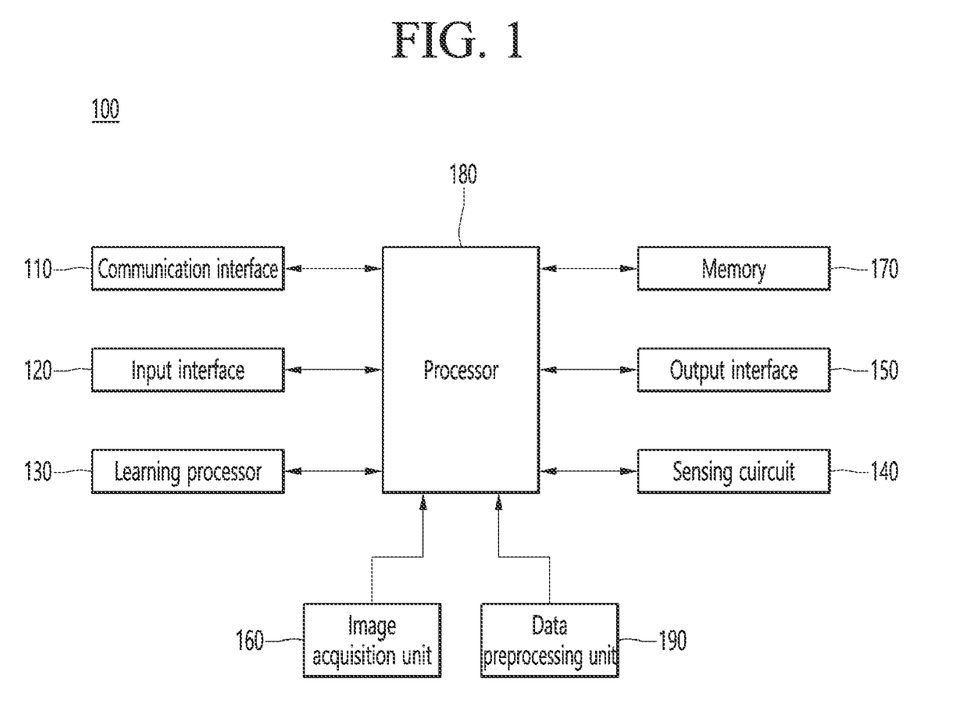
FIG. 1 is a block diagram showing a device for evaluating edge defects in a silicon wafer according to an embodiment.

FIG. 1 is a block diagram showing a device for evaluating edge defects in a silicon wafer according to an embodiment.

Referring to FIG. 1, a device 100 for evaluating edge defects in a silicon wafer according to an embodiment includes a communication interface 110, an input interface 120, a running processor 130, a sensing circuit 140, an output interface 150, and a memory. 170, an image acquisition unit 160, a data preprocessing unit 190, and a processor 180. The device 100 according to an embodiment may be an artificial intelligence (AI) device that performs a learning algorithm. Therefore, the device 100 according to the embodiment and the AI device may be referred to interchangeably.

The communication interface 110 may transmit/receive data to/from external devices such as other devices or servers using wired/wireless communication technology.

The input interface 120 may receive image data. In addition, The input interface 120 may acquire various types of data, such as a user input interface for receiving a voice signal and acquiring data from a user.

The learning processor 130 may learn a model composed of an artificial neural network using training data. Here, the learned artificial neural network may be referred to as a learning model. The learning model may be used to infer a result value for new input data other than learning data, and the inferred value may be used as a basis for a decision to perform a certain operation.

As will be described later, the learning model of the embodiment may include layered parameter formulas.

A defect attribute corresponding to an edge defect detected in image data of the image acquisition unit 160 may be output using the learning model. That is, values for each of various parameter values may be calculated from edge defects detected in image data. A learning model may be created by layering and modeling each of these various parameter values. Therefore, when the image data of the image acquisition unit 160 is input to the learning model, one defect attribute among a plurality of defect attributes (class 1 to class 6 in FIG. 5) is output according to the layered parameter formula of the learning model.

Figure 6:
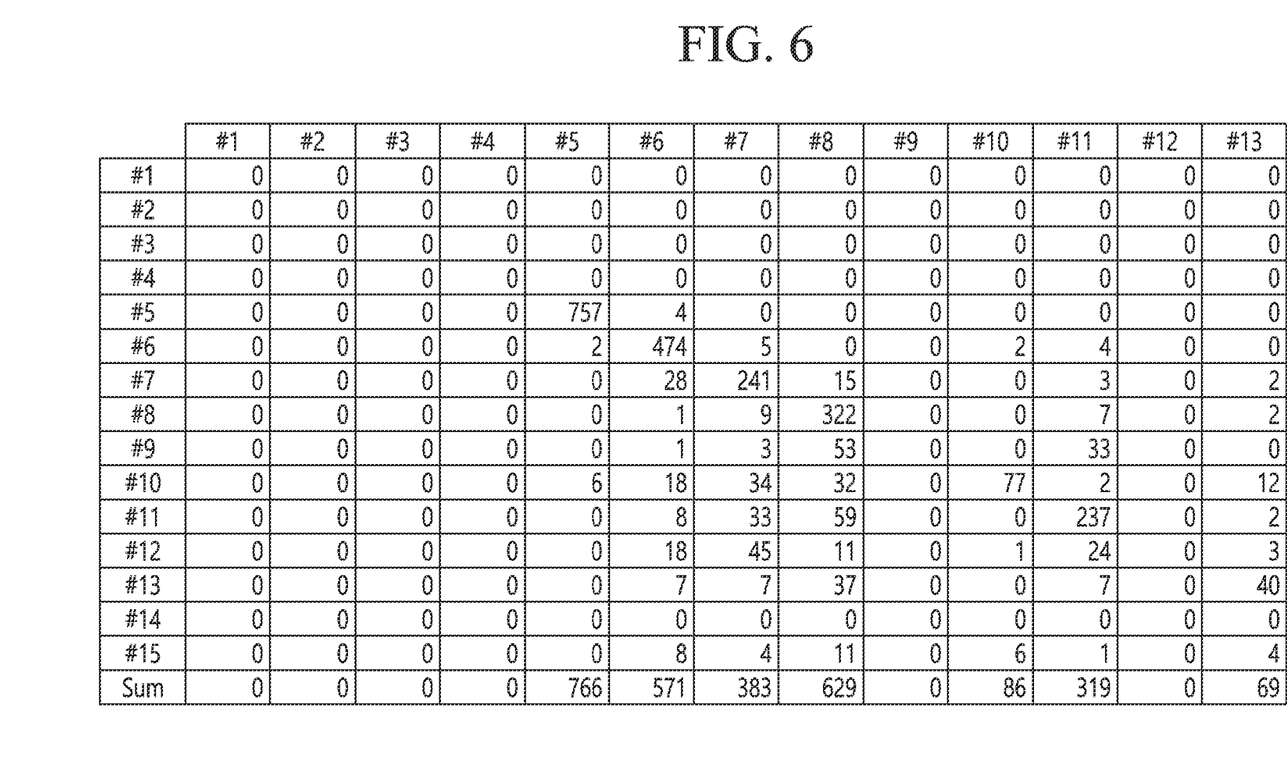
FIG. 6 shows an input/output table of the learning model.

FIG. 6 shows an input/output table of the learning model.

An input/output table of the learning model may be composed of a plurality of codes as inputs and a plurality of codes as outputs. Here, the code may be a routine of the layered parameter formula of the learning model. A defect attribute may correspond to each code, but is not limited thereto.

When the code having the largest number in the input/output table is determined by repeatedly learning the learning model, a defect attribute corresponding to the code may be output from the learning model.

According to an embodiment, accuracy of defect attributes may be calculated through defect attributes output each time a learning model is repeatedly trained for a large number of silicon wafers. If the accuracy of the defect attribute is less than or equal to the threshold value, the layered parameter formula of the learning model may be changed. As the layered parameter formulas of the learning model are periodically changed in this way, the accuracy of defect attributes output from the learning model can be remarkably increased.

By installing such a learning model with improved accuracy into an actual process line, accurate defect attributes for edge defects acquired from silicon wafers may be determined without additional equipment. Thus, defect management of the edge region of the silicon wafer becomes more precise, and reliability can be improved through quality improvement of the silicon wafer.

The artificial intelligence model to be loaded in the device 100 according to the embodiment may be learned in the learning processor 130, and may also be transmitted from an external device or server.

The sensing circuit 140 may acquire at least one of internal information of the AI device 100, surrounding environment information of the AI device 100, and user information using various sensors.

In addition, the sensing circuit 140 may include a camera, and it may be possible to receive an image for determining a wafer defect using the camera.

The image acquisition unit 160 to be described later may be included in the sensing circuit 140, but is not limited thereto.

The output interface 150 may generate an output related to sight, hearing, or touch.

The memory 170 may store data supporting various functions of the AI device 100. For example, the memory 170 may store input data acquired from the input interface 120, learning data, a learning model, a learning history, and the like.

The image acquisition unit 160 may acquire image data of an edge region of a silicon wafer. The image acquisition unit 160 may be called a camera, an image scanner, or the like.

Figure 3A:
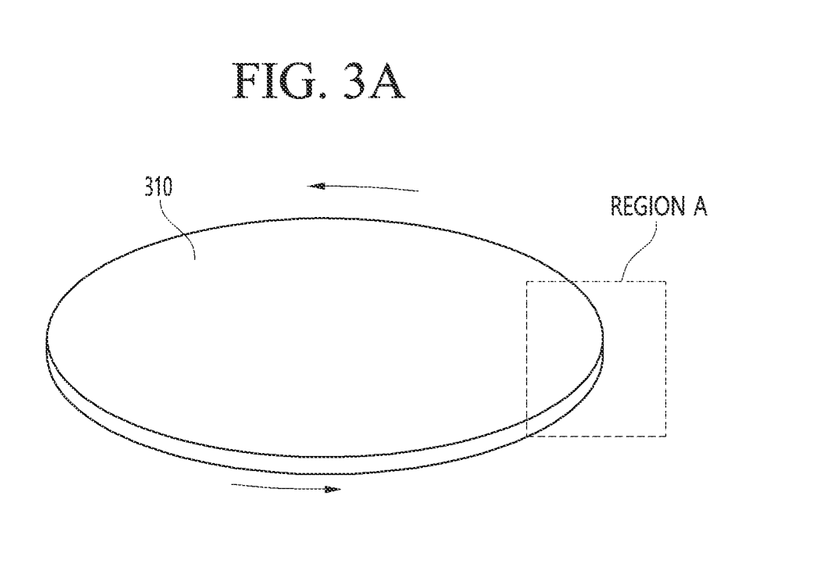
FIG. 3A and FIG. 3B illustrate acquisition of image data for an edge region of a silicon wafer.
Figure 3B:
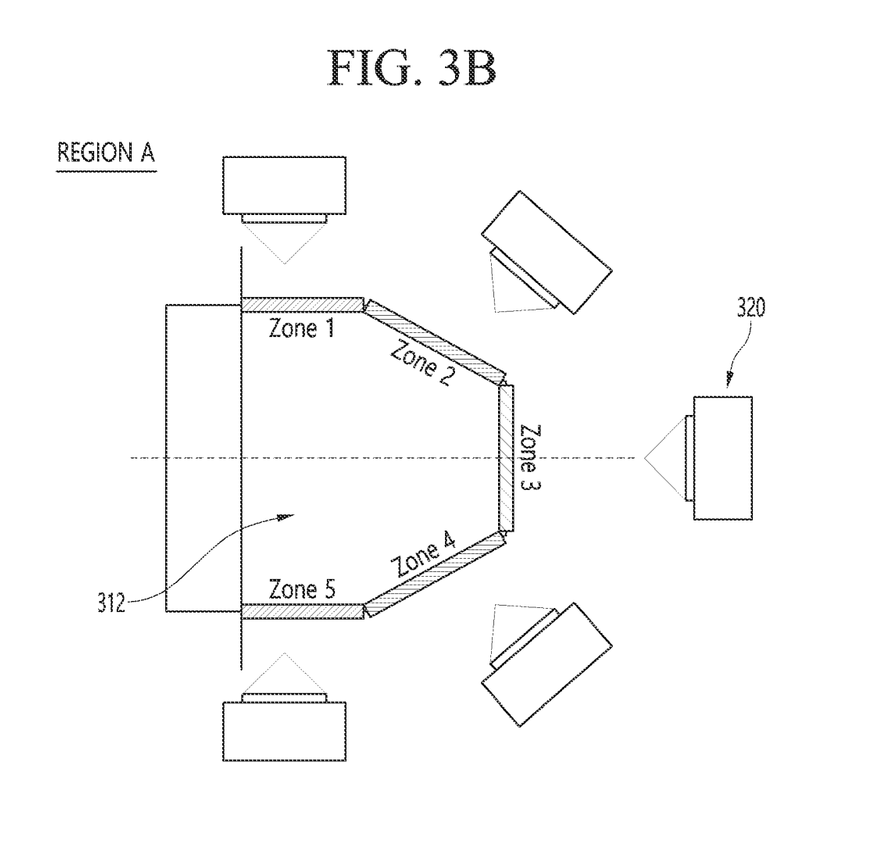

As shown in FIG. 3A and FIG. 3B, after an optical lens 320 of the image acquisition unit 160 is focused on various sub-regions Zone 1 to Zone 5 of the edge region 312 of the silicon wafer 310, image data may be acquired in each sub-region Zone 1 to Zone 5. The sub-regions Zone 1 to Zone 5 may be, for example, a lower edge region, an upper edge region, and a side region of the edge region 312 of the silicon wafer 310.

As an example, the body (not shown) of the image acquisition unit 160 may be movable along the X-axis, Y-axis, and Z-axis and may be also rotatable. As the image acquisition unit 160 is moved and rotated along the X-axis, Y-axis, Z-axis, etc., image data may be acquired in each of various sub-regions Zone 1 to Zone 5 of the edge region 312 of the silicon wafer 310 by the optical lens 320 of the image acquisition unit 160.

As another example, the body of the image acquisition unit 160 may be fixed. In this case, the plurality of optical lenses 320 simultaneously focus each of the plurality of sub-regions Zone 1 to Zone 5 of the silicon wafer 310 such that image data may be obtained simultaneously at the same time point.

In the embodiment, the image acquisition unit 160 may analyze image data acquired in each of a plurality of sub-regions Zone 1 to Zone 5 of the edge region 312 of the silicon wafer 310 to detect edge defects from the corresponding image data.

Meanwhile, detections of edge defects may be performed by the processor 180. In this case, image data acquired in each of the plurality of sub-regions Zone 1 to Zone 5 of the edge region 312 of the silicon wafer 310 in the image acquisition unit 160 may be transmitted to the processor 180. The processor 180 may analyze image data acquired in each of a plurality of sub-regions Zone 1 to Zone 5 of the edge region 312 of the silicon wafer 310 to detect edge defects from the corresponding image data.

When edge defects are detected in the image data acquired by the image acquisition unit 160, the data preprocessing unit 190 may measure the edge region 312 of the silicon wafer 310 using a measurement equipment, and determine defect attributes of the detected edge defects. The measurement equipment may include at least one of a 3D laser microscope, SEM, and TEM.

When edge detects are not detected in the image data acquired by the image acquisition unit 160, an operation of the data preprocessing unit 190 may not be performed. Unlike this, even if edge defects are not detected in the image data acquired by the image acquisition unit 160, the operation of the data preprocessing unit 190 may be performed. In this case, an edge defect that is not detected by the image acquisition unit 160 may be detected by the measurement equipment.

As shown in FIGS. 4A to 4F, various defect attributes may be determined through measurement by the measurement equipment. The defect attribute may mean an edge type.

Figure 4A:
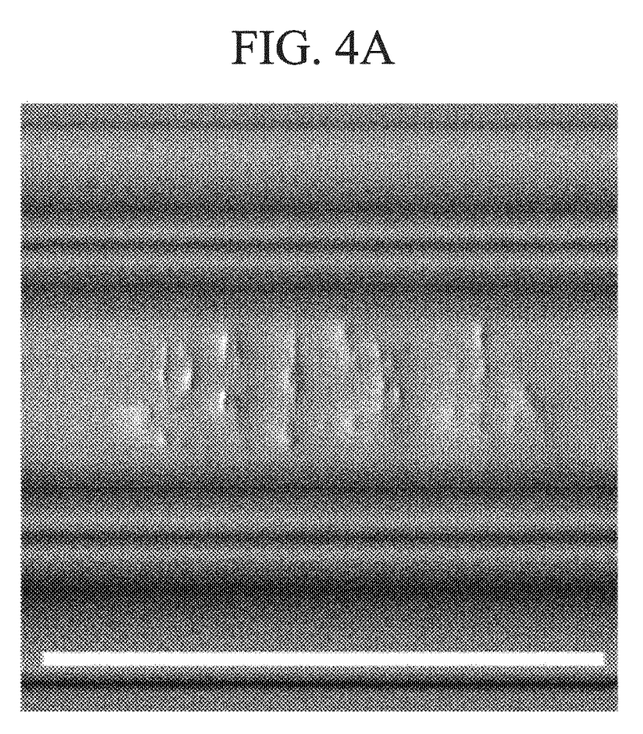
FIGS. 4A-4E show defect attributes of edge defects determined in a data preprocessing unit of FIG. 1.
Figure 4B:
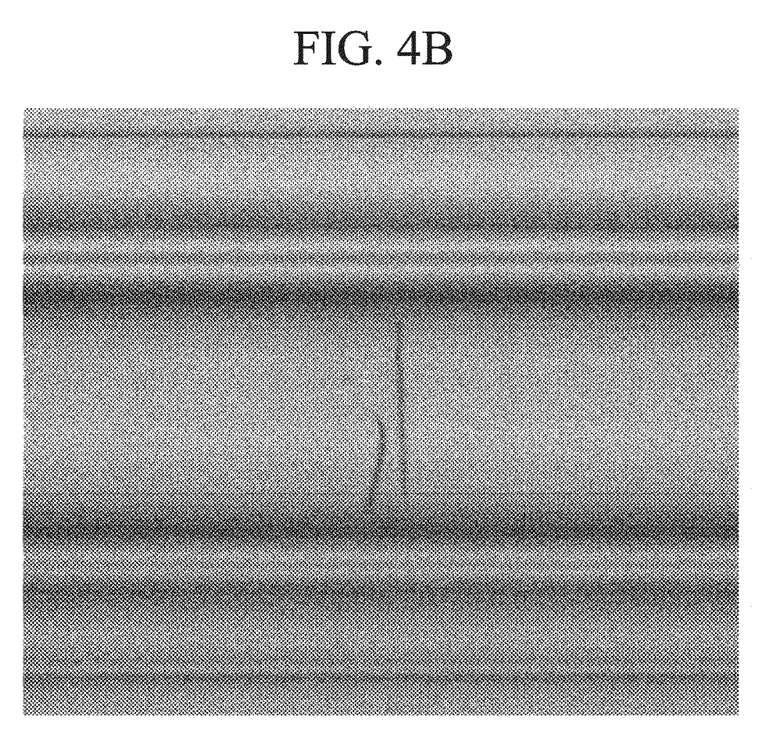
Figure 4C:
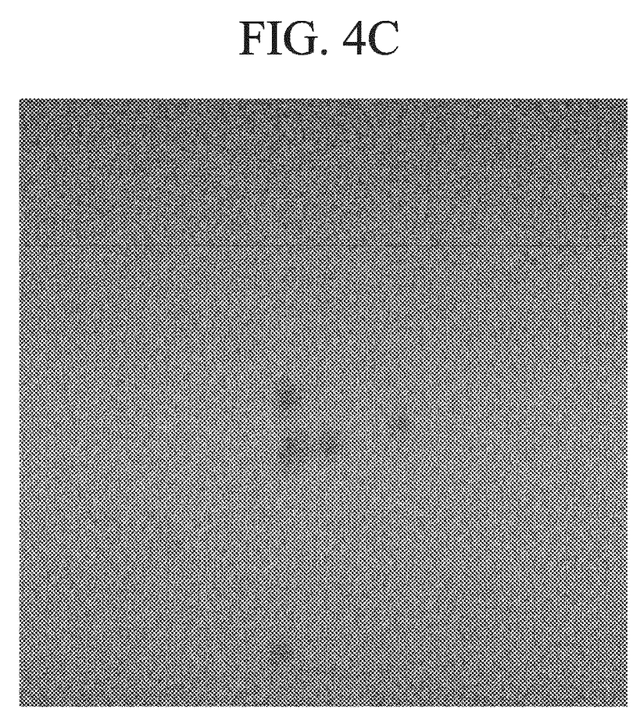
Figure 4D:
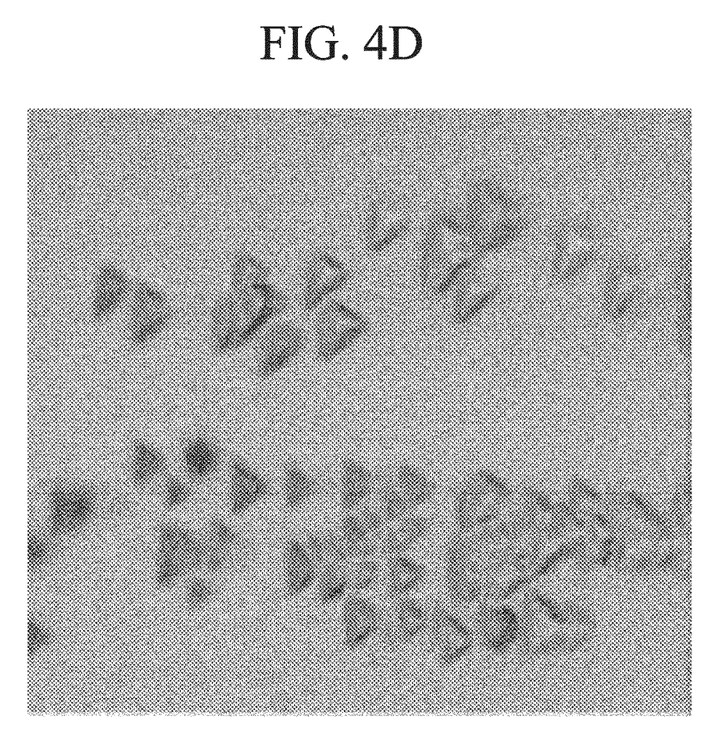
Figure 4E:
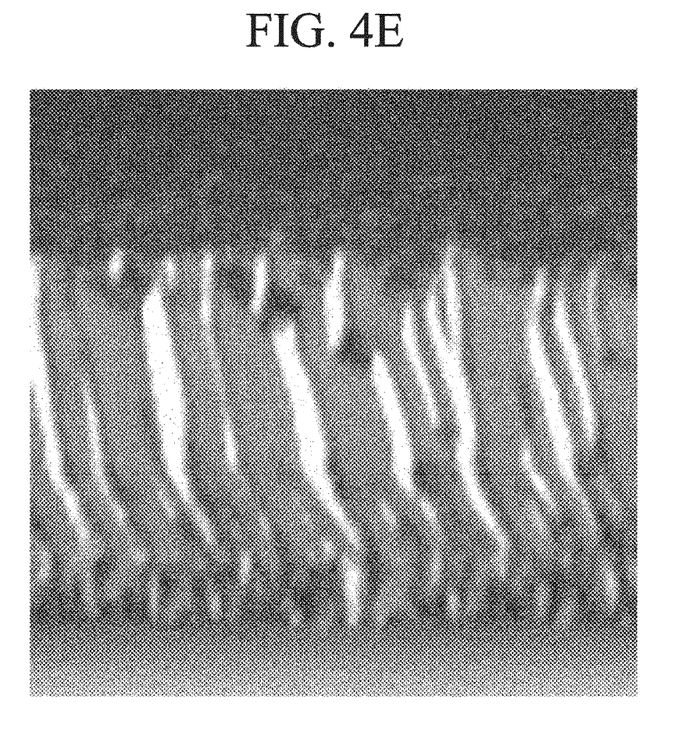

The defect attributes include, for example, embossing (FIG. 4A), scratches (FIG. 4B), particles (FIG. 4C), ESF (FIG. 4D), and crystals (FIG. 4E).

For example, a polished silicon wafer may be determined with defect attributes such as embossing (FIG. 4A), scratches (FIG. 4B), and particles (FIG. 4C).

EPI (epitaxial) silicon wafers are wafers used for direct product manufacturing, and require more precise edge defect management than the polished wafers. Thus, they need to be classified with more specific defect attributes. Thus, EPI silicon wafers may be determined with defect attributes such as embossing (FIG. 4A), scratch (FIG. 4B), particle (FIG. 4C), ESF (FIG. 4D), crystal (FIG. 4E).

The processor 180 may determine at least one executable operation of the AI device 100 based on information determined or generated using a data analysis algorithm or a machine learning algorithm. The processor 180 may perform the determined operation by controlling the components of the AI device 100.

The processor 180 may control overall operations of the device 100 according to the embodiment.

The processor 180 may control image data to be learned so as to output defect attributes corresponding to edge defects detected in the edge region 312 of the silicon wafer 310.

An artificial intelligence model, such as a learning model, may be stored in the memory 170.

As an example, the processor 180 may load a learning model from the memory 170 and control the learning model to be learned.

As another example, the learning processor 130 may load a learning model from the memory 170 and control the learning model. The learning processor 130 may be included in the processor 180.

Figure 5:
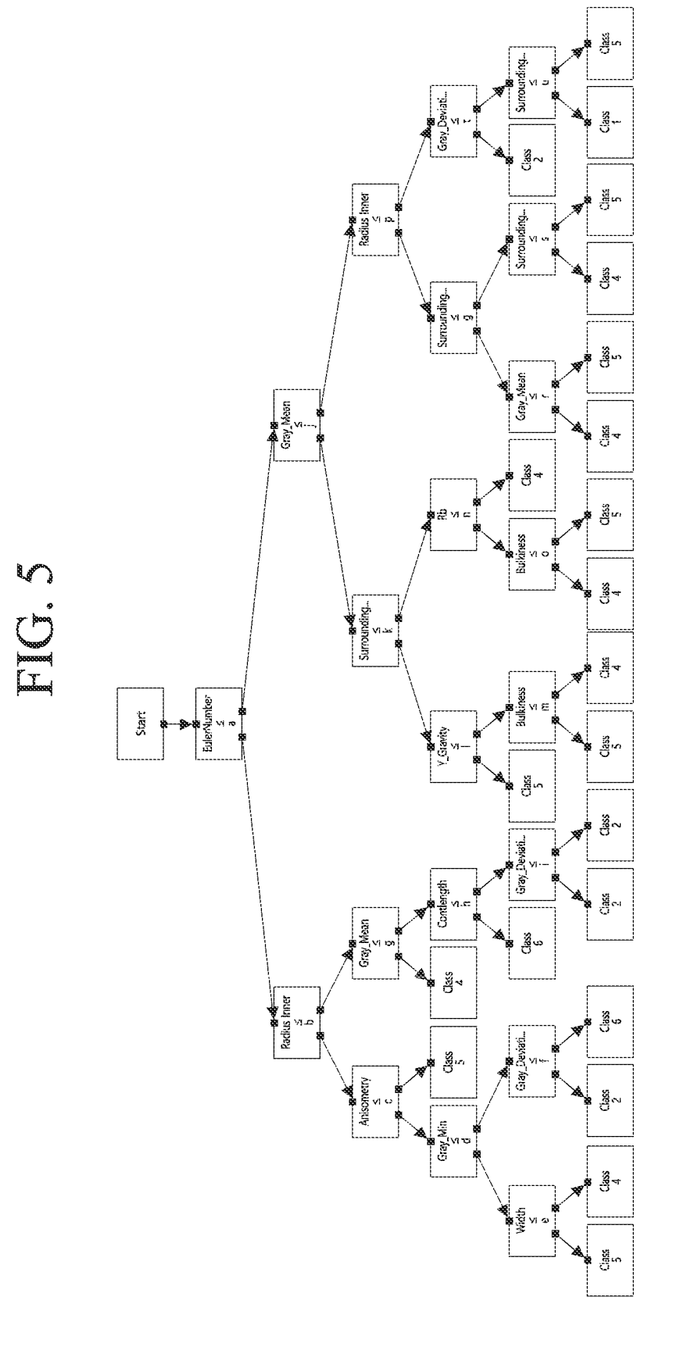
FIG. 5 shows layered parameter formulas included in the learning model.

As shown in FIG. 5, the learning model may include layered parameter formulas. Here, the parameters are minimum/maximum gray value, average gray value, standard deviation of gray, area, X/Y center coordinates, X/Y center of mass coordinates, area of each axis X/Y, circularity, compactness, contour length, convexity, rectangularity, fitting major axis/minor axis/angle, anisometry, bulkiness, structure factor, the radius of the smallest circumscribed circle, the radius of the largest inscribed circle, contour mean distance, contour distance standard deviation, roundness, polygon approximation parameters, hole area, diameter, Euler number, minimum rectangle long/short width, average gray value/gray standard deviation of at least two neighboring pixels, and the like.

In FIG. 5, a to u may be a threshold value of each parameter. Each parameter may be a parameter for an edge defect detected in the edge region 312 of the silicon wafer 310 detected by the image acquisition unit 160. Formulas in which these parameters are compared to thresholds can be layered. Therefore, a final output value may be output by being hierarchically calculated by these layered formulas. The final output value may be one of defect attributes class 1 to class 6. For example, class 1 may be embossing, class 2 may be scratches, and claim 3 may be particles. For example, class 4 may be an ESF, and class 5 may be crystals. For example, class 6 may be another defect attribute not defined in the embodiment.

Although six defect attributes class 1 to class 6 are shown in FIG. 5, more defect attributes are possible.

The learning model may output a defect attribute corresponding to an edge defect detected in image data of the image acquisition unit 160 using the layered parameter formula.

Meanwhile, the artificial intelligence model, such as the learning model, has been described as being learned by the processor 180, but it will also be possible for the apparatus 100 according to the embodiment to receive an artificial intelligence model learned from an external device or server.

Referring back to FIG. 1, the processor 180 may verify the accuracy of the defect attributes of the edge defects output from the learning model based on the combined attributes of the edge defects determined by the data preprocessing unit 190.

When one edge defect is detected in the image data of the edge region 312 of the silicon wafer 310 acquired by the image acquisition unit 160, the data preprocessing unit 190 may measure the edge region 312 of the silicon wafer 310, and detect and analyze an edge defect corresponding to the edge defect detected in the image data of the image acquisition unit 160 in the measured edge region 312 and determine a defect attribute for the edge defect.

Image data acquired by the image acquisition unit 160 may be input to the learning model. Specifically, various parameter values acquired from image data acquired by the image acquisition unit 160 may be input to the learning model. each of these parameter values may be acquired by analyzing image data acquired by the image acquiring unit 160. In this case, the parameters acquired from the image data may be the same parameters as the layered parameters shown in FIG. 5.

The learning model may output one defect attribute among a plurality of defect attributes class 1 to class 6 by calculating the layered parameter formula based on each parameter value acquired from image data.

In this case, the processor 180 may determine whether defect attributes determined by the data preprocessing unit 190 and defect attributes output from the output model are the same for the same edge defect detected in the silicon wafer 310.

If the defect attributes determined by the data preprocessing unit 190 and the defect attributes output from the output model are the same, the layered parameter formula is well set in the learning model, which means that classification of the defect attributes of the output model is accurate.

If the defect attributes determined by the data preprocessing unit 190 and the defect attributes output from the output model are different, the layered parameter formula is incorrectly set in the learning model, which means that the classification of the defect attributes of the output model is not accurate.

However, it is difficult to verify the accuracy of the learning model for one edge defect. Accordingly, in the embodiment, accuracy may be increased by iteratively verifying the accuracy of the learning model for each of various silicon wafers including a polished silicon wafer and an EPI silicon wafer.

In spite of such iterative accuracy verification, when the accuracy of the defect attribute output from the learning model is less than or equal to the threshold value, the layered parameter formula set in the learning model may be changed. For example, a threshold value of each of the layered parameter formula may be changed or a position of each of the layered parameter formula may be changed. Accuracy of the defect attributes output from the learning model may vary depending on the defect attributes, but is not limited thereto.

Hereinafter, a method for evaluating edge defects in a silicon wafer according to an embodiment will be described with reference to FIG. 2.

Figure 2:
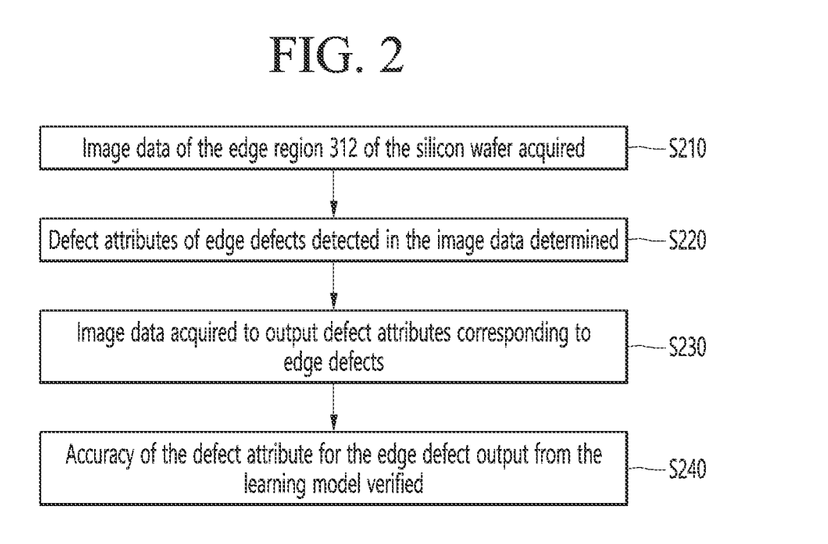
FIG. 2 is a flowchart illustrating a method for evaluating edge defects in a silicon wafer according to an embodiment.

FIG. 2 is a flowchart illustrating a method for evaluating edge defects in a silicon wafer according to an embodiment.

Referring to FIG. 1 and FIG. 2, the image acquiring unit 160 may acquire image data of the edge region 312 of the silicon wafer (S210).

As shown in FIG. 3A and FIG. 3B, the optical lens 320 of the image acquisition unit 160 may acquire image data of the edge region 312 of the silicon wafer 310 by focusing the circumference of the edge region 312 of the silicon wafer 310. The image data may or may not have edge defects.

The image data can be analyzed to detect edge defects. Edge defect candidates may be detected based on various parameter values from image data, and edge defects may be detected by precisely analyzing these edge defect candidates.

Meanwhile, conventionally, it is difficult to detect edge defects in the edge region 312 of the silicon wafer 310, and specific defect attributes of the edge defects cannot be classified or determined.

In the embodiment, defect attributes may be classified or determined by using the image data acquired by the image acquisition unit 160 as a learning model. That is, when various parameter values of the image data are input to the learning model, defect attributes for edge defects detected in the image data may be output. In this case, the accuracy of the defect attributes classified or determined by the learning model must be high.

S220, S230, and S240 to be described below relate to methods for increasing the accuracy of defect attributes classified or determined in a learning model.

That is, the data preprocessing unit 190 may provide reference defect attributes for verifying the accuracy of defect attributes output from the learning model.

To this end, the data preprocessing unit 190 may determine defect attributes of edge defects detected in the image data (S220). That is, the data preprocessing unit 190 may determine a specific defect attribute of the edge defect detected in the image data in the image acquisition unit 160.

First, the edge region 312 of the silicon wafer 310 may be measured using a measurement equipment. For example, the measurement equipment may include one or more of a 3D laser microscope, SEM, and TEM.

For example, the number of defect attributes may vary for a polished silicon wafer and an EPI silicon wafer. For example, in the case of the polished silicon wafer, there may be three such as embossing (FIG. 4A), scratch (FIG. 4B), and particle (FIG. 4C), but is not limited thereto. In the case of the EPI silicon wafer, there may be five such as embossing (FIG. 4A), scratch (FIG. 4B), particle (FIG. 4C), ESF (FIG. 4D), and crystal (FIG. 4E), but this is not limited thereto.

The data preprocessing unit 190 may analyze data related to the edge region 312 of the silicon wafer 310 measured using the measuring equipment, thereby determining defect attributes for edge defects present in the edge region 312 of the silicon wafer 310.

Meanwhile, the processor 180 may control image data to be learned so as to output defect attributes corresponding to edge defects (S230).

For example, the processor 180 may load the learning model in the memory 170 and then input the image data acquired by the image acquisition unit 160 to the learning model. That is, various parameter values for edge defects detected in the image data may be input to the learning model.

The learning model may include layered parameter formulas. Accordingly, the learning model may receive each of parameter values for an edge defect detected in the image data and output a defect attribute for the edge defect by calculating the layered parameter formula. That is, as shown in FIG. 5, one defect attribute among a plurality of defect attributes class 1 to class 6 may be output by calculating the layered parameter formula.

The processor 180 may verify the accuracy of the defect attribute for the edge defect output from the learning model (S240).

That is, the processor 180 may compare the defect attribute of the edge defect determined by the data preprocessing unit 190 with the defect attribute of the edge defect output from the learning model. The defect attributes of the edge defects determined by the data preprocessing unit 190 and the defect attributes of the edge defects output from the learning model may be the same edge defects as those detected in the image data acquired by the image acquisition unit 160.

The processor 180 may determine that the setting of the layered parameter formula set in the learning model may be valid when the defect attribute for the edge defect determined by the data preprocessing unit 190 and the defect attribute for the edge defect output from the learning model are the same. For example, if the defect attribute for the edge defect determined in the data preprocessing unit 190 is embossing, but the defect attribute for the edge defect output from the learning model is also embossing, the layered parameter formula set in the learning model is determined to be valid.

The processor 180 determines that the setting of the layered parameter formula set in the learning model may be not valid when the defect attribute for the edge defect determined by the data preprocessing unit 190 and the defect attribute for the edge defect output from the learning model are different. For example, if the defect attribute for the edge defect determined by the data preprocessing unit 190 is embossing, but the defect attribute for the edge defect output from the learning model is a scratch, the layered parameter formula set in the learning model is determined not to be valid.

As such, when it is determined that the layered parameter formula set in the learning model are not valid, the processor 180 may change the layered parameter formula.

In this way, after the layered parameter calculation formulas of the learning model are changed, by performing S210, S220, S230, and S240, the accuracy of the defect attribute output from the learning model may be verified again.

By repeatedly performing such an operation, the accuracy of defect attributes output from the learning model may be increased.

As another embodiment, even if the layered parameter formulas of the learning model are not changed, the accuracy of defect attributes output from the learning model may be increased by repeatedly performing S210, S220, S230 and S240 to increase the number of learning operations of the learning model.

The above detailed description should not be construed as limiting in all respects and should be considered illustrative. The scope of the embodiments should be determined by reasonable interpretation of the appended claims, and all changes within the equivalent range of the embodiments are included in the scope of the embodiments.

The invention claimed is:

1. A device for evaluating edge defects in a silicon wafer, comprising:
    a memory comprising a learning model;
    an image acquiring unit comprising a camera or an image scanner and configured to acquire image data of an edge region of the silicon wafer;
    a data preprocessing unit comprising a measurement equipment that includes at least one of a 3D laser microscope, SEM and TEM and configured to measure an edge region of the silicon wafer to determine a second defect attribute when an edge defect is detected in the acquired image data; and
    a processor,
    wherein the processor is configured:
    to detect the edge defect from the acquired image data,
    to analyze the detected edge defect to acquire parameters,
    to control to learn the acquired image data to output a first defect attribute corresponding to the detected edge defect by inputting the acquired parameters of the detected edge defect to the learning model, and
    to verify an accuracy of the output first defect attribute of the detected edge defect based on the determined second defect attribute of the detected edge defect.

2. The device of claim 1, wherein the first and second defect attributes each includes one of embossing, scratches, particles, crystals or ESF.

3. The device of claim 1,
    wherein the learning model includes layered parameter formulas related to the acquired parameters of the detected edge defect.

4. The device of claim 1, wherein the learning model outputs the first defect attribute corresponding to the detected edge defect detected in the acquired image data using layered parameter formulas.

5. The device of claim 3, wherein the processor changes the layered parameter formulas when the accuracy of the first defect attribute is less than or equal to a threshold value.

6. A method for evaluating edge defects in a silicon wafer, comprising:
    acquiring image data of an edge region of the silicon wafer;
    measuring an edge region of the silicon wafer using a measurement equipment to determine a second defect attribute when an edge defect is detected in the acquired image data;
    detecting the edge defect from the acquired image data;
    analyzing the detected edge defect to acquire parameters;
    controlling to learn the acquired image data to output a first defect attribute corresponding to the detected edge defect by inputting the acquired parameters of the detected edge defect to a learning model stored in a memory; and
    verifying an accuracy of the output first defect attribute of the detected edge defect based on the determined second defect attribute of the detected edge defect.

7. The method of claim 6, wherein the measurement equipment includes at least one of a 3D laser microscope, SEM, and TEM.

8. The method of claim 6, wherein the first and second defect attributes each includes one of embossing, scratches, particles, crystals or ESF.

9. The method of claim 6, wherein the learning of the acquired image data is performed by layered parameter formulas related to the acquired parameters of the detected edge defect and included in the learning model.

10. The method of claim 9, wherein the controlling to learn the acquired image data comprising:
    outputting the first defect attribute corresponding to the detected edge defect detected in the acquired image data using the layered parameter formulas.

11. The method of claim 9, further comprising:
    changing the layered parameter formulas when the accuracy of the defect attribute is less than or equal to a threshold value.

* * * * *